2,882,199
CHLORINATED 4,5,6,7-TETRACHLORO - 4,7 - ENDOXO-4,7,8,9-TETRAHYDROPHTHALANE INSECTICIDES

Hans Feichtinger, Duisburg-Beeck, and Hans Werner Linden, Moers, Germany, assignors to Ruhrchemie Aktiengesellschaft, Oberhausen-Holten, Germany, a corporation of Germany No Drawing. Application April 4, 1957
Serial No. 650,549

Claims priority, application Germany April 20, 1956

14 Claims. (Cl. 167—33)

This invention relates to, and has as its object, the production of novel chlorination products of 4,5,6,7-tetrachloro-4,7 - endoxo - 4,7,8,9 - tretrahydrophthalane which have been found to constitute highly active insecticides.

The novel chlorination products, in accordance with the invention, have the structural formula

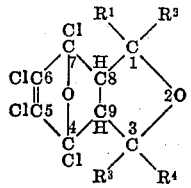

in which $R^1$, $R^2$, $R^3$ and $R^4$ are each a member selected from the group consisting of Cl and H, at least one of $R^1$, $R^2$, $R^3$ and $R^4$ being Cl and at least one other of $R^1$, $R^2$, $R^3$, and $R^4$ being H.

$R^1$ and $R^3$ are preferably H and $R^2$ and $R^4$ are preferably chlorine forming a very highly active insecticide of 1,3,4,5,6,7-hexachloro-4,7-endoxo-4,7,8,9 - tetrahydrophthalane.

The novel chlorination products, in accordance with the invention, may be obtained by the Diels-Alder addition of 2,5-dihydrofurane to tetrachlorofurane and by the subsequent chlorination of the 4,5,6,7-tetrachloro-4,7-endoxo-4,7,8,9-tetrahydrophthalane formed. In connection with the formation of the 1,3,4,5,6,7-hexachloro product, the reaction proceeds in two steps as follows:

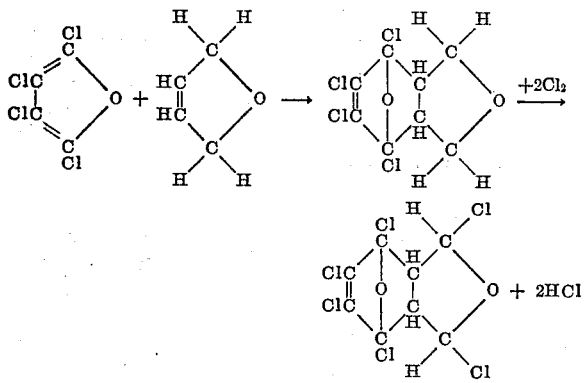

The Diels-Alder addition of the 2,5-dihydrofurane to the tetrachlorofurane may be effected at temperatures between about 50 and 150° C. and preferably 90 to 100° C. which results in a yield of about 90 to 95% of the theoretical yield of the addition compound. Purification of the addition compound is preferably effected by high vacuum distillation. This purified compound is a crystal product having a melting point of 105° C.

The addition may also be effected in continuous operation if the two compounds undergoing the addition reaction, i.e. the diene and dienophil, are passed together through a tubular system with a solvent heated to about 100 to 120° C. After leaving the reaction tube, the 4,5,6,7-tetrachloro-4,7-endoxo-4,7,8,9-tetrahydrophthalane is separated by crystallization or distillation. Suitable solvents are, for example, hydrocarbons having from 8 to 12 carbon atoms in the molecule.

The chlorination of the addition compound may be effected by the conventional and well known methods for the chlorination of hydrocarbons. It is preferable to allow the chlorine to act upon the addition compound in solution in the presence of actinic light. The actinic light may be generated, for example, by mercury vapor lamps, illuminating tubes, normal incandescent electric bulbs, sunlight or bright daylight.

The chlorination is preferably effected in a solvent which is resistant to chlorine and in which the addition product may be dissolved or dispersed, as for example low boiling chlorohydrocarbons such as carbon tetrachloride, chloroform or trichloroethylene.

During the chlorination the temperature of the reaction mixture should preferably be maintained between 0 and about 70° C. The chlorination may, however, be effected at temperatures in excess of 70° C. The chlorine, while in the gaseous state, is preferably introduced into the solution of the addition product with constant stirring.

It is also possible to effect the chlorination using conventional chlorinating agents such as sulfuryl chloride or sulfur chloride ($S_2Cl_2$). The chlorination may also be effected in the presence of radical-forming catalysts which effect the acceleration of the chlorine absorption, as for example, in the presence of organic peroxides or azo compounds. The chlorine addition takes place at the 1 and/or 3 position. The absorption of two chlorine atoms into the molecule of the 4,5,6,7-tetrachloro-4,7-endoxo-4,7,8,9-tetrahydrophthalane proceeds at a relatively high velocity but the further absorption of chlorine proceeds considerably slower.

The novel chlorination products are formed by the addition of 1 to 3 chlorine atoms and preferably 2 chlorine atoms so that the final phthalanes have 5 to 7 chlorine atoms in the molecule.

The chlorination product is separated by distilling off the solvent used and a further purification of the residue is possible by recrystallization from alcohol or hydrocarbons.

The novel chlorination products, in accordance with the invention, show a high insecticidal activity against many noxious insect pests and, in particular, biting and sucking insects.

The novel chlorination product may be used in the conventional manner for insecticides. Thus for example, the same may be formed into a dusting powder by admixture with an inert solid carrier material or may be formed into an insecticidal spray by dissolving or dispersing the same in the conventional liquid carrier materials for insecticides.

The insecticides may also be used in combination with other insecticidally active materials such as gamma hexachlorocyclohexane. Small quantities of other materials such as pyrethrum extracts, alethrin, piperanol butoxide etc. will act synergistically to increase the insecticidal effect of the products in accordance with the invention.

The following examples are given by way of illustration and not limitation:

EXAMPLE 1

A mixture of 69 grams (0.33 mol) of tetrachlorofurane and 47 grams (0.67 mol) of 2,5-dihydrofurane was heated for 20 hours at 100° C. in a shaking autoclave. After cooling of the autoclave, the excess dihydrofurane was removed from the reaction mixture by distillation at atmospheric pressure. There resulted a brownish residue, the greatest part of which was in crystallized form. By distillation of this residue under high vacuum at 0.05–0.06 mm. mercury and at 103–107° C., 83 grams corresponding to 90% of the theoretically possible yield of 4,5,6,7-tetrachloro-4,7-endoxo-4,7,8,9-tetrahydrophthalane could be obtained as a colorless distillate. The distillate crystallized during the distillation within the receiver. The melting point of the resulting crystals was 105° C. Recrystallization from petroleum ether resulted in fine, snow-white crystal needles having a melting point of 104–105° C.

Analysis.—$C_8H_6O_2Cl_4$. Molecular weight: 275.96 (calculated).

|   | Calculated, percent | Found, percent |
|---|---|---|
| C | 34.82 | 34.63 |
| H | 2.19 | 2.23 |
| O | 11.60 | 11.78 |
| Cl | 51.39 | 51.52 |

EXAMPLE 2

27.6 grams (0.1 mol) of 4,5,6,7-tetrachloro-4,7-endoxo-4,7,8,9-tetrahydrophthalane were dissolved in 100 cc. of carbon tetrachloride and treated with gaseous chlorine for 3¼ hours at 65–70° C. while irradiating with ultraviolet light with the chlorine being introduced at a rate of 2.4 liters per hour. The treatment with chlorine was effected while vigorously mixing with a gastight stirrer. After evaporation of the solvent, there remained 32.6 grams of a light and partially crystallizing residue. The chlorine content of the residue was 59.25% and corresponded to the empirical molecular formula $$C_8H_{4.6}O_2Cl_{5.4}$$

EXAMPLE 3

In the manner described in Example 2, 27.6 grams (0.1 mol) of 4,5,6,7-tetrachloro-4,7-endoxo-4,7,8,9-tetrahydrophthalane were dissolved in 100 cc. of carbon tetrachloride and chlorinated for 4 hours at 70° C. After the removal of the solvent, there was obtained a bright residue in amount of 34.4 grams which was first of oily consistency but soon crystallized completely. The chlorine content was 61.58%, the empirical molecular formula was $C_8H_4O_2Cl_6$.

EXAMPLE 4

In the manner described in Example 2, 27.6 grams (0.1 mol) of 4,5,6,7-tetrachloro-4,7-endoxo-4,7,8,9-tetrahydrophthalane were dissolved in 100 cc. of chloroform and chlorinated for 5¾ hours at the boiling temperature. The partially crystallizing residue remaining upon evaporation of the solvent and amounting to 36.2 grams had a chlorine content of 63.80% and corresponded to the empirical molecular formula $C_8H_{3.5}O_2Cl_{6.5}$.

The chlorination products of 4,5,6,7-tetrachloro-4,7-endoxo-4,7,8,9-tetrahydrophthalane, alone or in mixture with liquid or solid carrier materials, may be used in any conventional manner for controlling noxious insects. For use as liquid spray, the chlorination mixture is dissolved or dispersed in the conventional liquid carrier materials. The chlorination product of the invention is particularly well suited for use as dust or spray powder since it is capable, due to its crystalline form, of being processed into a most fine- non-caking dust and of being well mixed with the usual additions, such as with wetting and dispersing agents.

The chlorination mixture according to the invention is very readily soluble in organic solvents, such as acetone, toluene, xylene, aromatic and aliphatic hydrocarbons, or can be applied in mixtures, or emulsions of solvents of this kind with water, if necessary or desired together with suitable emulsifiers and adhesives. By combination with other insecticidal compounds, such as γ-1,2,3,4,5,6-hexachlorocyclohexane, the insecticidal properties of the chlorination products of the invention can be still further increased by partially synergistic effects. The initial effect may be increased by small additions (1–5%) of, for example, pyrethrum extracts, alethrin, piperonyl butoxide and others. The formulations mentioned in the following examples show by now means all of the potential applications and combinations but represent only specific examples. The parts given in these examples are parts by weight.

EXAMPLE 5

Dusting agent

Part of the chlorination mixture obtained according to Example 3 was very finely ground with 197 parts of talc with the addition of a mixture of 1 part of heavy benzene and 1 part of fat alcohol-ethylene condensation product. An insecticide dusting agent was thus formed.

EXAMPLE 6

Emulsion

Dissolving of 20 parts of the chlorination mixture obtained according to Example 3 and 5 parts of fat alcohol-ethylene condensation product (Emulsifier G 2081 of Chemische Fabrik Goldschmidt, Essen) in 75 parts of xylene resulted in a concentrate which, prior to use, was stirred up with 2000–5000 parts of water to form an emulsion.

EXAMPLE 7

Suspension 40 parts of the chlorination mixture obtained according to Example 3 were extremely finely ground with 10 parts of Emulsifier GA 6590 (Goldschmidt) and 50 parts of kaolin. Prior to use, 1 part of this dust was stirred up in 5000 parts of water.

EXAMPLE 8

Spray

Part of the chlorination mixture obtained according to Example 3 was dissolved in 99 parts of kerosene.

The new chloro-endoxo-tetrahydrophthalanes in accordance with the invention have surprising insecticidal properties. The mortality of Musca domestica L. ♀ of an age of four days, dependent upon the dosage, was determined after a constant time of exposure (24 hours) by the Hoskins-Messenger small vial method (Agricultural Control Chemicals, Advances in Chemistry, Series I (1950), pages 93–98).

The insecticidal effect of the chlorination mixture increases as the absorption of chlorine increases and reaches its maximum at a total of 6 chlorine atoms in the molecule. The following Table I shows the mortalities of Musca domestica L. ♀ as a function of the degree of chlorination and the dosage.

TABLE I

| Chlorination mixture according to example | Chlorine content and empirical molecular formula | Dosage, γ/sq. cm. | Mortalities, percent |
|---|---|---|---|
| 2 | Cl=59.25% | 137 | 95 |
|   |  | 68 | 83 |
|   | $C_8H_{4.6}O_2Cl_{5.4}$ | 10 | 40 |
|   | Cl=61.58% | 137 | 100 |
| 3 |  | 68 | 100 |
|   | $C_8H_4O_2Cl_6$ | 10 | 90 |
|   | Cl=63.80% | 137 | 60 |
| 4 |  | 68 | 55 |
|   | $C_8H_{3.5}O_2Cl_{6.5}$ | 10 | 40 |

In the following Tables II and III, the mortalities for Calandra granaria and Calandra orycae obtained with the chlorination product according to Example 3 and determined by the Wagner-Jauregg Petri dish test (see Liebigs Annalen der Chemie, vol. 561, 91 (1949)) are listed as a function of the time of exposure and the dosage.

TABLE II
*Calandra granaria* L. (grain weevil)

| Dosage, γ/sq. cm. | Percent mortalities after— | | | |
|---|---|---|---|---|
| | 1 day | 2 days | 3 days | 4 days |
| 13 | 56 | 100 | 100 | 100 |
| 1.3 | 32 | 56 | 100 | 100 |
| 0.13 | 23 | 52 | 92 | 100 |

TABLE III
*Calandra orycae* L. (rice weevil)

| Dosage, γ/sq. cm. | Percent mortalities after— | | | |
|---|---|---|---|---|
| | 1 day | 2 days | 3 days | 4 days |
| 13 | 100 | 100 | 100 | 100 |
| 1.3 | 73 | 100 | 100 | 100 |
| 0.13 | 56 | 82 | 100 | 100 |

The same good effect was found on a number of other noxious insects such as *Doralis pomi*, *Doralis fabae* and *Eriosoma lanigerum*.

The Tables I to III show that the novel chlorination products, in accordance with the invention, have their greatest efficiency if they contain about 6 chlorine atoms in their molecule.

We claim:
1. A chlorination product of 4,5,6,7,-tetrachloro-4,7-endoxo-4,7,8,9-tetrahydrophthalane having the formula

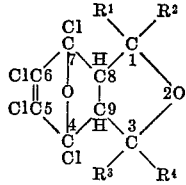

in which $R^1$, $R^2$, $R^3$, and $R^4$ are each a member selected from the group consisting of Cl and H, at least one of $R^1$, $R^2$, $R^3$ and $R^4$ being Cl and at least one other of $R^1$, $R^2$, $R^3$ and $R^4$ being H.

2. 1,3,4,5,6,7-hexachloro-4,7-endoxo-4,7,8,9 - tetrahydrophthalane.

3. As a new compound 4,5,6,7-tetrachloro-4,7-endoxo-4,7,8,9-tetrahydrophthalane having the formula

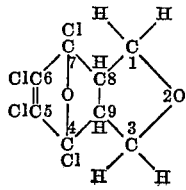

obtained by the Diels-Alder-addition of 2,5-dihydrofurane to tetrachlorofurane.

4. 1,4,5,6,7 - pentachloro - 4,7 - endoxo - 4,7,8,9-tetrahydrophthalane.

5. 3,4,5,6,7 - pentachloro - 4,7 - endoxo - 4,7,8,9-tetrahydrophthalane.

6. 1,1,4,5,6,7 - hexachloro - 4,7-endoxo-4,7,8,9-tetrahydrophthalane.

7. 3,3,4,5,6,7 - hexachloro - 4,7 - endoxo-4,7,8,9-tetrahydrophthalane.

8. 1,1,3,4,5,6,7 - heptachloro - 4,7-endoxo-4,7,8,9-tetrahydrophthalane.

9. 1,3,3,4,5,6,7 - heptachloro-4,7-endoxo-4,7,8,9-tetrahydrophthalane.

10. A chlorination product of 4,5,6,7-tetrachloro-4,7-endoxo-4,7,8,9-tetrahydrophthalane having an average of about 6 chlorine atoms in its molecule.

11. Method of controlling insect pests which comprises applying composition comprising a chlorination product of 4,5,6,7 - tetrachloro - 4,7-endoxo-4,7,8,9-tetrahydrophthalane having the formula

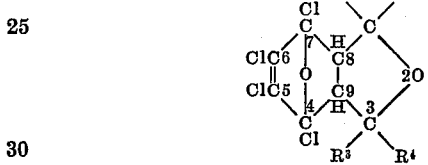

in which $R^1$, $R^2$, $R^3$, and $R^4$ are each a member selected from the group consisting of Cl and H at least one of $R^1$, $R^2$, $R^3$, and $R^4$ being Cl and at least one other of $R^1$, $R^2$, $R^3$ and $R^4$ being H and an insecticide carrier material to at least one insect pest in its habitat.

12. The method according to claim 11 in which the composition additionally includes at least one additional insecticidally active compound selected from the group of compounds consisting of gamma hexachlorocyclohexane, pyrethrum, alethrin and piperonyl butoxide.

13. The method of controlling insect pests which comprises applying a composition comprising 1,3,4,5,6,7-hexachloro-4,7-endoxo- 4,7,8,9-tetrahydrophthalane in an insecticide carrier material to at least one insect pest in its habitat.

14. The method according to claim 13 in which the composition additionally includes at least one additional insecticidally active compound selected from the group of compounds consisting of gamma hexachlorocyclohexane, pyrethrum, alethrin and piperonyl butoxide.

References Cited in the file of this patent
UNITED STATES PATENTS
2,655,513    Kleinman _____ Oct. 13, 1953